US008667176B2

(12) United States Patent
Zhang

(10) Patent No.: US 8,667,176 B2
(45) Date of Patent: Mar. 4, 2014

(54) NETWORK SERVICE ACCESS METHOD AND ACCESS GATEWAY EQUIPMENT

(75) Inventor: Zhouting Zhang, Guangdong (CN)

(73) Assignee: Sangfor Technologies Company Limited, Shenzhen (CN)

( * ) Notice: Subject to any disclaimer, the term of this patent is extended or adjusted under 35 U.S.C. 154(b) by 298 days.

(21) Appl. No.: 12/985,467

(22) Filed: Jan. 6, 2011

(65) Prior Publication Data

US 2011/0173339 A1  Jul. 14, 2011

(30) Foreign Application Priority Data

Jan. 14, 2010 (CN) .................. 2010 1 00444146

(51) Int. Cl.
*G06F 15/173* (2006.01)
*H04L 29/08* (2006.01)
*H04L 29/12* (2006.01)

(52) U.S. Cl.
CPC ...... *H04L 29/08288* (2013.01); *H04L 67/1036* (2013.01); *H04L 29/12066* (2013.01); *H04L 61/1511* (2013.01)
USPC ............................ 709/241; 709/239; 709/240

(58) Field of Classification Search
CPC ................... H04L 29/08288; H04L 29/08297; H04L 67/1038; H04L 29/12066; H04L 61/1511; H04L 67/1036
See application file for complete search history.

(56) References Cited

U.S. PATENT DOCUMENTS

| 7,877,510 | B2 * | 1/2011 | Datta et al. ..................... 709/239 |
| 8,145,788 | B1 * | 3/2012 | Love et al. ..................... 709/241 |
| 8,266,319 | B2 * | 9/2012 | Zisapel et al. ................. 709/238 |
| 2007/0245352 | A1 * | 10/2007 | Ma ............................... 718/105 |

* cited by examiner

*Primary Examiner* — Andrew L Nalven
*Assistant Examiner* — Quy Pham

(57) ABSTRACT

The present invention includes a network service access method. In one embodiment, such a method comprises: forwarding the domain name resolution requests to a local domain name server of each Internet service provider providing services through access link corresponding with the Internet service provider; receiving Internet Protocol address on the domain name resolution requests which the local domain name server of each Internet service provider returned from the corresponding access link; selecting the Internet Protocol address according to line state of the access link of each Internet service provider providing services and returning the selected Internet Protocol address to the user equipments; and visiting network services by the access link of the Internet service provider returning the selected Internet Protocol address.

10 Claims, 4 Drawing Sheets

NETWORK SERVICE ACCESS METHOD AND ACCESS GATEWAY EQUIPMENT

TECHNICAL FIELD

The invention relates to the field of communication, in particular to a network service access method and access gateway equipment.

BACKGROUND ART

At present Internet users can use the access links of multiple Internet service providers (ISP) to access the network services. Each ISP provides the users with its own Domain Name System (DNS) server and converts the Domain Name into the Internet Protocol (IP) address with DNS service. In addition, the application service providers also publish their own network services with multiple ISP links and take over the domain name resolution works with their own intelligent DNS server. The application service provider 15 publishes its own network services (such as WEB) with two ISP (marked as ISP1 and ISP2) networks (marked as 112 and 122) and resolves its own domain name with its own intelligent DNS server 152, as shown in FIG. 1. The rules for resolving domain names are when the source address requested by DNS is the IP address of the DNS server 111 of ISP1, the intelligent DNS returns the IP address of the network service on ISP1, while when the source address requested by DNS is the IP address of the DNS server 121 of ISP2, the intelligent DNS requires to return the IP address of the network service on ISP2. When the user equipments 14 (such as computers) are connected with the access links 113 and 123 of ISP1 and ISP2 through the access gateway equipments 13, multiple DNS servers IP can be set in the user equipments 14. However, the preferred DNS server is generally the only one selected to resolve the domain name, which means only if the preferred DNS server is failed to resolve, will the user equipments 14 select other DNS servers to carry out the resolution. For example, if the preferred DNS server in the user equipments 14 is the DNS server 111 of ISP1, the access gateway equipments 13 will forward the domain name resolution requests to the DNS server 111 after they have received those requests of the network services sent by the user equipments 14, then the DNS server 111 will send the domain name resolution requests to the intelligent DNS server 151 of the application service provider 15 and the intelligent DNS server 151 will return the IP address of the network services on ISP1 to the DNS server 111 according to the foregoing domain name resolution rules of the intelligent DNS server 151, then the IP address is sent form the DNS server 111 to the access gateway equipments 13 and is returned from the access gateway equipments 13 to the user equipments 14, and then the user equipments 14 will originate the network service access requests to the access gateway equipments 13 according to the IP address and the access gateway equipments 13 will visit the network services on the server 152 of the application service provider 15 through the access link 113 of ISP1 after they have identified that the IP address belongs to ISP1. In the network structure shown in FIG. 1, if the DNS server 111 of ISP1 is set to be the preferred DNS server in multiple user equipments 14 connected with the access gateway equipments 13, all user equipments 14 will visit the network services through the access link 113 of ISP1, thereby causing overloads and congestion on the access link 113 of ISP1 and reducing the access speed of network services.

SUMMARY OF THE INVENTION

In view of the existing technical problems, the embodiment of the present invention provides a network service access method and access gateway equipment, which can balance the loads on the access links of different service providers so as to improve the access speed of network services.

In order to solve the existing technical problems, the embodiment of the present invention proposes a network service access method which comprises:

receiving domain name resolution requests sent by user equipments;

forwarding the domain name resolution requests to a local domain name server of each Internet service provider providing services through access link corresponding with the Internet service provider;

receiving Internet Protocol address on the domain name resolution requests which the local domain name server of each Internet service provider returned from the corresponding access link;

selecting the Internet Protocol address according to line state of the access link of each Internet service provider providing services and returning the selected Internet Protocol address to the user equipments; and receiving network service access requests carrying the selected Internet Protocol address sent by the user equipments and visiting network services by the access link of the Internet service provider returning the selected Internet Protocol address.

Accordingly, the embodiment of the present invention also proposes an access gateway equipment, which comprises:

a domain name resolution requests receiving module receiving the domain name resolution requests sent by the user equipments;

a forward module forwarding the domain name resolution requests received by the domain name resolution requests receiving module to the local domain name server of each Internet service provider providing services through the access link corresponding with the Internet service provider;

a network address receiving module receiving the Internet Protocol address on the domain name resolution requests which the local domain name server of each Internet service provider returned from the corresponding access link after the forward module had forwarded the domain name resolution requests;

a select module selecting the Internet Protocol address according to the line state of the access link of each Internet service provider providing services after the network address receiving module has received the Internet Protocol address and returning the selected Internet Protocol address to the user equipments; and a network service access module receiving the network service access requests carrying the selected Internet Protocol address sent by the user equipments after the select module has returned the selected Internet Protocol address to the user equipments and visiting the network services by the access link of the Internet service provider returning the selected Internet Protocol address.

In the implementation of the embodiment of the invention, the domain name resolution requests are forwarded to the local domain name server of each service provider through the access link corresponding with the service provider and the Internet Protocol address corresponding to the network services returned by the local domain name server of each service provider is received so as to obtain the Internet Protocol address of the network services on different service provider networks; the Internet Protocol address is selected according to the line state of the access link of each service provider and is returned to the user equipments. The network service access requests carrying the selected Internet Protocol address sent by the user equipments are received and the network services are visited through the access link of the service provider corresponding with the Internet Protocol address in the network service access requests, thereby balancing the loads on the access links of different service providers so as to improve the access speed of network services.

BRIEF DESCRIPTION OF THE DRAWINGS

In order to more clearly illustrate the embodiments of the invention or the technical programs in the existing technology, the embodiments or the drawings needed to be used in the description of the existing technology will be briefly introduced. It's obvious for those skilled in the art that the drawings described below are just some embodiments of the invention and can be used to obtain other drawings without the creative works.

DETAILED DESCRIPTION OF THE PREFERRED EMBODIMENTS

The embodiment of the invention proposes a network service access method and access gateway equipment that can balance the loads on the access links of different service providers so as to improve the access speed of network services.

Figure 1:
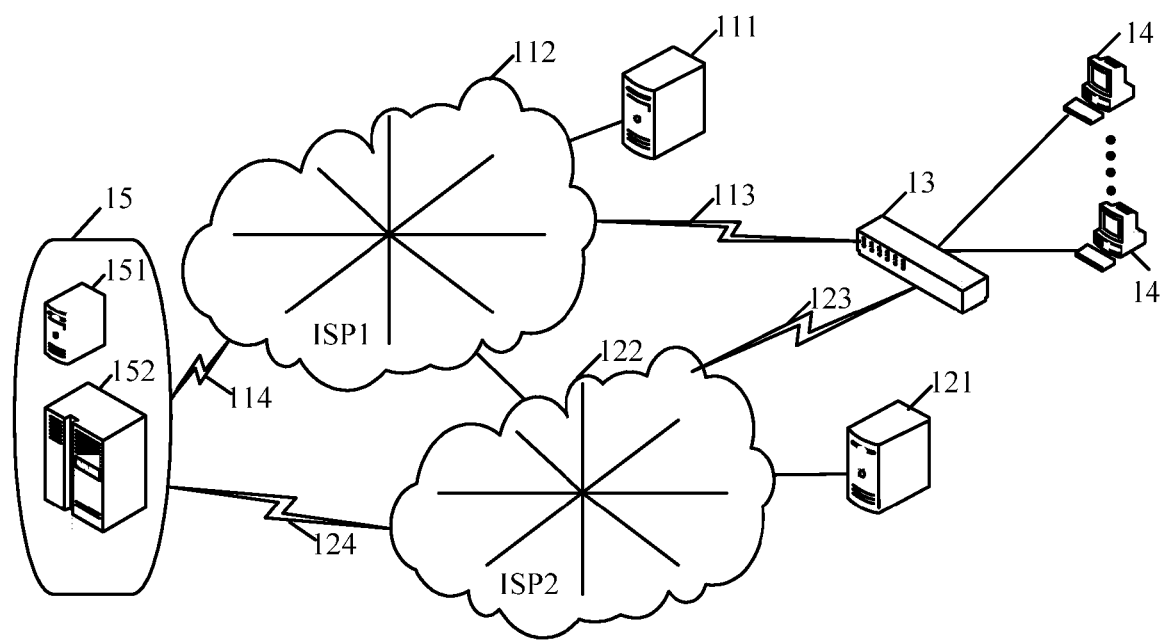
FIG. 1 is a schematic view of the network structure of the access links of multiple Internet service providers visiting the network services.
Figure 2:
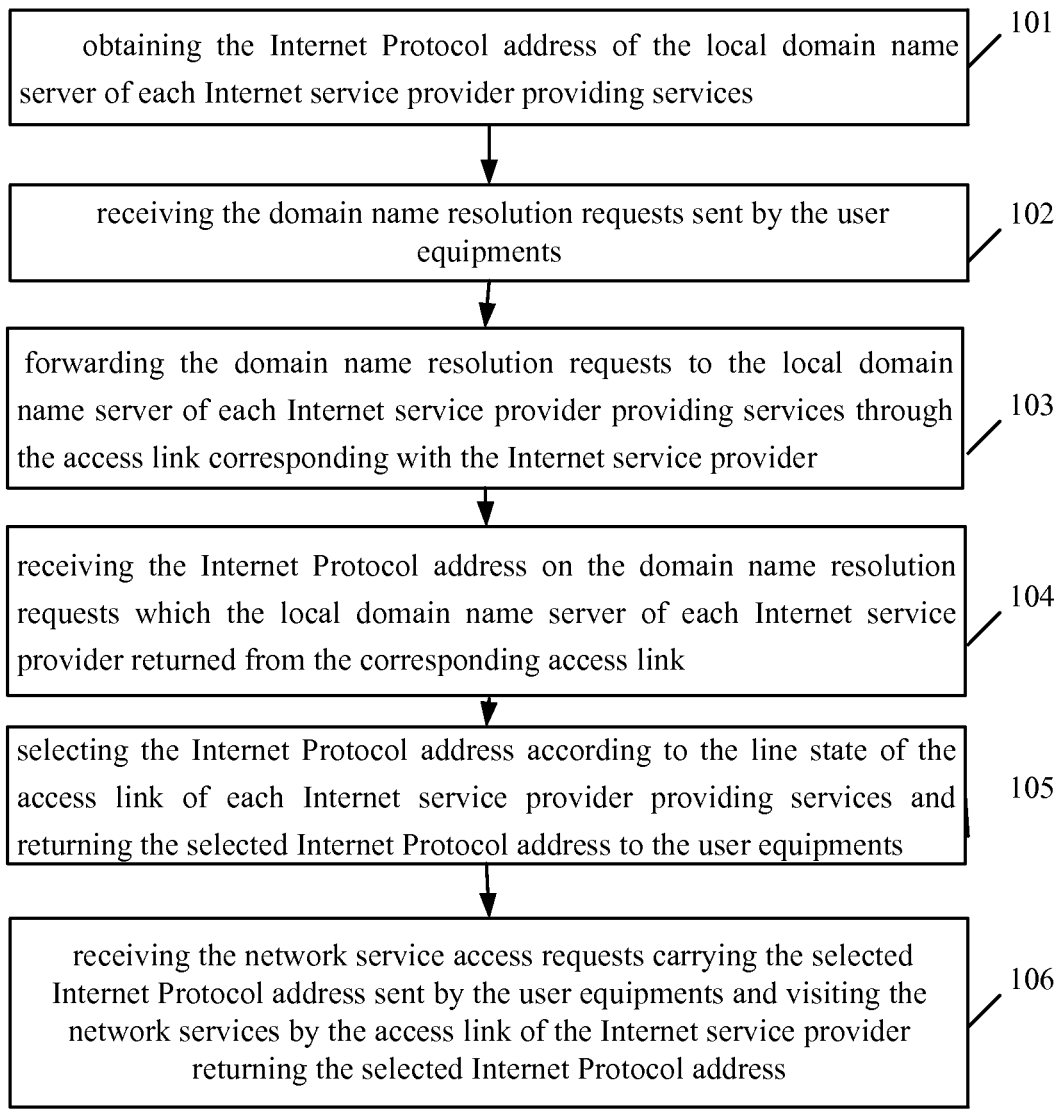
FIG. 2 is a flow chart of a network service access method in the embodiment of the invention.

FIG. 2 is a flow chart of a network service access method in the embodiment of the invention, which includes:

Step 101: obtaining the Internet Protocol address of the local domain name server of each Internet service provider providing services;

Here, the access gateway equipments obtain the Internet Protocol address of the local domain name server of each ISP providing services in advance. For example, in the network structure shown in FIG. 1, ISP1 and ISP2 are ISP providing services and the access gateway equipments 13 are connected with the access link 113 of ISP1 and the access link 123 of ISP2 so that they respectively obtain the Internet Protocol addresses of the local domain name server 111 of ISP1 and the local domain name server 121 of ISP2. When implemented specifically, the access gateway equipments 13 inquire and obtain the IP address of the local domain name server 111 through the access link 113 of ISP1, as well as that of local domain name server 121 through the access link 123 of ISP2. When the access gateway equipments have obtained the IP address of the local domain name server of each ISP providing services, the network service access method of the embodiment of the invention proceeds to step 102.

Step 102: receiving the domain name resolution requests sent by the user equipments;

Here, the access gateway equipments receive the domain name resolution requests for the network services sent by the user equipments, for example, the domain name resolution requests for the name of some website.

Step 103: forwarding the domain name resolution requests to the local domain name server of each Internet service provider providing services through the access link corresponding with the Internet service provider;

Here, when implemented specifically, the domain name resolution requests are forwarded to the local domain name server of the Internet service provider according to the Internet Protocol address of the local domain name server of the Internet service provider. For example, in the network structure shown in FIG. 1, the access gateway equipments 13 forward the domain name resolution requests to the local domain name server 111 through the access link 113 of ISP1 and to the local domain name server 121 through the access link 123 of ISP2. If the access gateway equipments 13 are also connected with the access links of other ISP providing services, they forward the domain name resolution requests to the local domain name server of the ISP through the access link of the ISP. For the local domain name server of other ISP without the corresponding access link of ISP, it's not necessary for the access gateway equipments to forward the domain name resolution requests to the local domain name server of the ISP.

Step 104: receiving the Internet Protocol address on the domain name resolution requests which the local domain name server of each Internet service provider returned from the corresponding access link;

Here, after the local domain name server of each ISP proving services has received the domain name resolution requests sent by the access gateway equipments, it will forward those requests to the intelligent DNS server of the application service providers and receive the IP address of the network services on the ISP network according to the foregoing domain name resolution rules of the intelligent DNS server and then return the IP address to the access gateway equipments through the corresponding access link. At this time, the access gateway equipments can obtain the Internet Protocol addresses of the network services on different service provider networks. For example, in the network structure shown in FIG. 1, the access gateway equipments 13 receive the IP addresses which the local domain name server 111 and the local domain name server 121 respectively returned from the access link 113 of ISP1 and the access link 123 of ISP2, and also the IP address of the network services on ISP1 and ISP2. In addition, the access gateway equipments 13 can also establish the association relationship between the Internet Protocol address and the access link of the Internet service provider returning the Internet Protocol address. For example, in the network structure shown in FIG. 1, the association relationship shown in Table 1 can be established:

TABLE 1

| access link | IP address |
|---|---|
| ISP1 | IP1 |
| ISP2 | IP2 |

Step 105: selecting the Internet Protocol address according to the line state of the access link of each Internet service provider providing services and returning the selected Internet Protocol address to the user equipments;

Here, when implemented specifically, the access gateway equipments can select the Internet Protocol address according to the link absolute residual bandwidth, the proportion of residual bandwidth or the number of connections of the access links of each service provider. In one embodiment, step 105 may include the following sub-steps:

Step 1051: detecting the line state of the access link of each Internet service provider providing services;

Step 1052: determining the access link used for visiting the network services according to the line state;

Here, in the network structure shown in FIG. 1, for example, the access gateway equipments 13 detect that the absolute residual bandwidth of the access link 113 of ISP1 is lower than the preset congestion threshold value and the absolute residual bandwidth of the access link 123 of ISP2 is higher than the preset congestion threshold value, which means the loads on the access link 113 of ISP1 are bigger than those on the access link 123 of ISP2 and the access gateway equipments 13 now select the access link 123 of the network services on ISP2 as the access link visiting the network services. Also, the access gateway equipments 13 detect that the absolute residual bandwidth of the access link 113 of ISP1 is lower than that of the access link 123 of ISP2, which also means the loads on the access link 113 of ISP1 are bigger than those on the access link 123 of ISP2 and the access gateway equipments 13 now select the access link 123 of ISP2 as the access link visiting the network services. Since the situations of determining the access links visiting the network services according to the number of connections or other judgment conditions are similar to the forgoing ones, they are not be described in detail.

Step 1053: obtaining the corresponding Internet Protocol address according to the determined access link used for visiting the network services and the association relationship.

Here, the access gateway equipments obtain the IP address of the network services on the access link of the ISP as the IP address corresponding to the network services returned to the user equipments. For example, in the network structure shown in FIG. 1, the association relationship can be searched in Table 1 so as to obtain the IP address of the network services on the access link of the ISP. For example, if the access link 123 of ISP2 is currently selected as the access link visiting the network services, the association relationship is searched in Table 1 to obtain the IP address IP2 of the network services on the access link 123 of ISP2.

Step 106: receiving the network service access requests carrying the selected Internet Protocol address sent by the user equipments and visiting the network services by the access link of the Internet service provider returning the selected Internet Protocol address.

Here, after the selected Internet Protocol address has been returned from the access gateway equipments to the user equipments, the user equipments obtain the Internet Protocol address of the domain name resolution requests sent in step 102 and then originate the network service access requests carrying the Internet Protocol address to the access gateway equipments. The access gateway equipments receive the network service access requests carrying the Internet Protocol address sent by the user equipments and visit the network services by the access link of the Internet service provider returning the selected Internet Protocol address. When implemented specifically, Table 1 can be searched according to the Internet Protocol address in the network service access requests so as to obtain the access link of the corresponding Internet service provider through which the network services are visited. For example, in the network structure shown in FIG. 1, the access gateway equipments receive the network service access requests carrying the Internet Protocol address IP2 sent by the user equipments and the association relationship can be searched in Table 1 to obtain the access link 123 of the ISP of the network services on IP2 address.

Figure 3:
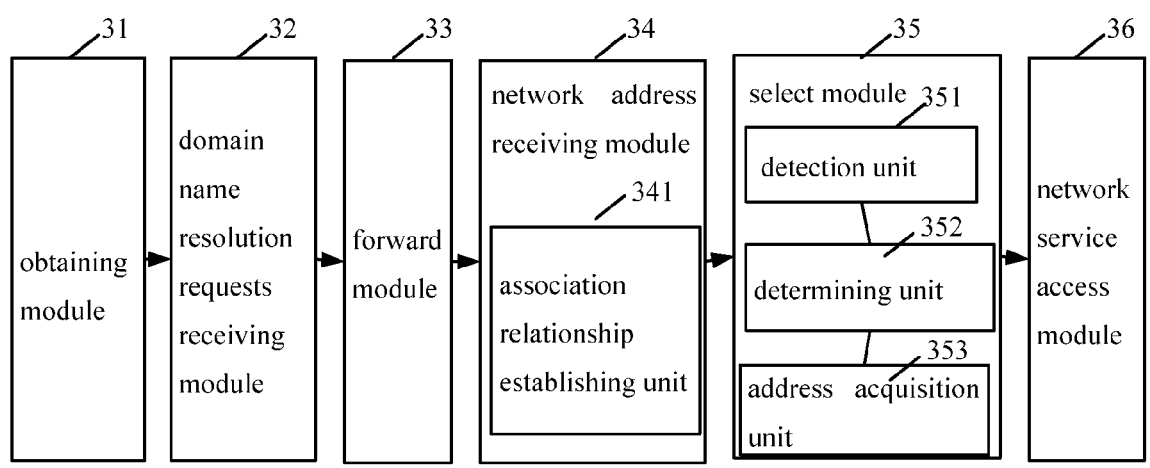
FIG. 3 is a structure diagram of an access gateway equipment in the embodiment of the invention.

FIG. 3 is a structure diagram of the access gateway equipment in the embodiment of the invention, which includes:

An obtaining module 31 is used to obtain the Internet Protocol address of the local domain name server of each Internet service provider providing services;

Here, the access gateway equipments obtain the Internet Protocol address of the local domain name server of each ISP providing services in advance. For example, in the network structure shown in FIG. 1, ISP1 and ISP2 are ISP providing services and the access gateway equipments 13 are connected with the access link 113 of ISP1 and the access link 123 of ISP2 so that they respectively obtain the Internet Protocol addresses of the local domain name server 111 of ISP1 and the local domain name server 121 of ISP2. When implemented specifically, the access gateway equipments 13 inquire and obtain the IP address of the local domain name server 111 through the access link 113 of ISP1, as well as that of local domain name server 121 through the access link 123 of ISP2.

A domain name resolution requests receiving module 32 is used to receive the domain name resolution requests sent by the user equipments;

Here, the access gateway equipments receive the domain name resolution requests for the network services sent by the user equipments, for example, the domain name resolution requests for the name of some website.

A forward module 33 is used to forward the domain name resolution requests received by the domain name resolution requests receiving module 32 to the local domain name server of each Internet service provider providing services through the access link corresponding with the Internet service provider;

Here, when implemented specifically, the domain name resolution requests are forwarded to the local domain name server of the Internet service provider according to the Internet Protocol address of the local domain name server of the Internet service provider. For example, in the network structure shown in FIG. 1, the access gateway equipments 13 forward the domain name resolution requests to the local domain name server 111 through the access link 113 of ISP1 and to the local domain name server 121 through the access link 123 of ISP2. If the access gateway equipments 13 are also connected with the access links of other ISP providing services, they forward the domain name resolution requests to the local domain name server of the ISP through the access link of the ISP. For the local domain name server of other ISP without the corresponding access link of ISP, it's not necessary for the access gateway equipments to forward the domain name resolution requests to the local domain name server of the ISP.

A network address receiving module 34 is used to receive the Internet Protocol address on the domain name resolution requests which the local domain name server of each Internet service provider returned from the corresponding access link after the forward module 33 had forwarded the domain name resolution requests;

Here, after the local domain name server of each ISP proving services has received the domain name resolution requests sent by the access gateway equipments, it will forward those requests to the intelligent DNS server of the application service providers and receive the IP address of the network services on the ISP network according to the foregoing domain name resolution rules of the intelligent DNS server and then return the IP address to the access gateway equipments through the corresponding access link. At this time, the access gateway equipments can obtain the Internet Protocol addresses of the network services on different service provider networks. For example, in the network structure shown in FIG. 1, the access gateway equipments 13 receive the IP addresses which the local domain name servers 111 and 121 respectively returned from the access link 113 of ISP1 and the access link 123 of ISP2, and also the IP address of the network services on ISP1 and ISP2. In addition, the access gateway equipments 13 can also establish the association relationship between the Internet Protocol address and the access link of the Internet service provider returning the Internet Protocol address. For example, in the network structure shown in FIG. 1, the association relationship shown in Table 1 can be established.

After the network address receiving module 34 has received the Internet Protocol address, a select module 35 is used to select the Internet Protocol address according to the line state of the access link of each Internet service provider providing services and return the selected Internet Protocol address to the user equipments;

Here, when implemented specifically, the access gateway equipments can select the Internet Protocol address according to the link absolute residual bandwidth, the proportion of residual bandwidth or the number of connections of the access links of each service provider. The select module 35 specifically includes:

A detection unit 351 is used to detect the line state of the access link of each Internet service provider providing services;

A determining unit 352 is used to determine the access link used for visiting the network services according to the line state detected by the detection unit 351;

Here, in the network structure shown in FIG. 1, for example, the access gateway equipments 13 detect that the absolute residual bandwidth of the access link 113 of ISP1 is lower than the preset congestion threshold value and the absolute residual bandwidth of the access link 123 of ISP2 is higher than the preset congestion threshold value, which means the loads on the access link 113 of ISP1 are bigger than those on the access link 123 of ISP2 and the access gateway equipments 13 now select the access link 123 of the network services on ISP2 as the access link visiting the network services. Also, the access gateway equipments 13 detect that the absolute residual bandwidth of the access link 113 of ISP1 is lower than that of the access link 123 of ISP2, which also means the loads on the access link 113 of ISP1 are bigger than those on the access link 123 of ISP2 and the access gateway equipments 13 now select the access link 123 of ISP2 as the access link visiting the network services. Since the situations of determining the access links visiting the network services according to the number of connections or other judgment conditions are similar to the forgoing ones, they are not be described in detail.

An address acquisition unit 353 is used to obtain the corresponding Internet Protocol address in the association relationship establishing unit according to the access link used for visiting the network services determined by the determining unit 352.

Here, the access gateway equipments obtain the IP address of the network services on the access link of the ISP as the IP address corresponding to the network services returned to the user equipments. For example, in the network structure shown in FIG. 1, the association relationship can be searched in Table 1 so as to obtain the IP address of the network services on the access link of the ISP. For example, if the access link 123 of ISP2 is currently selected as the access link visiting the network services, the association relationship is searched in Table 1 to obtain the IP address IP2 of the network services on the access link 123 of ISP2.

A network service access module 36 is used to receive the network service access requests carrying the selected Internet Protocol address sent by the user equipments after the select module 35 has returned the selected Internet Protocol address to the user equipments and visit the network services by the access link of the Internet service provider returning the selected Internet Protocol address.

Here, after the selected Internet Protocol address has been returned from the access gateway equipments to the user equipments, the user equipments obtain the Internet Protocol address of the sent domain name resolution requests and then originate the network service access requests carrying the Internet Protocol address to the access gateway equipments. The access gateway equipments receive the network service access requests carrying the Internet Protocol address sent by the user equipments and visit the network services by the access link of the Internet service provider returning the selected Internet Protocol address. When implemented specifically, Table 1 can be searched according to the Internet Protocol address in the network service access requests so as to obtain the access link of the corresponding Internet service provider through which the network services are visited. For example, in the network structure shown in FIG. 1, the access gateway equipments receive the network service access requests carrying the Internet Protocol address IP2 sent by the user equipments and the association relationship can be searched in Table 1 to obtain the access link 123 of the ISP of the network services on IP2 address.

Figure 4:
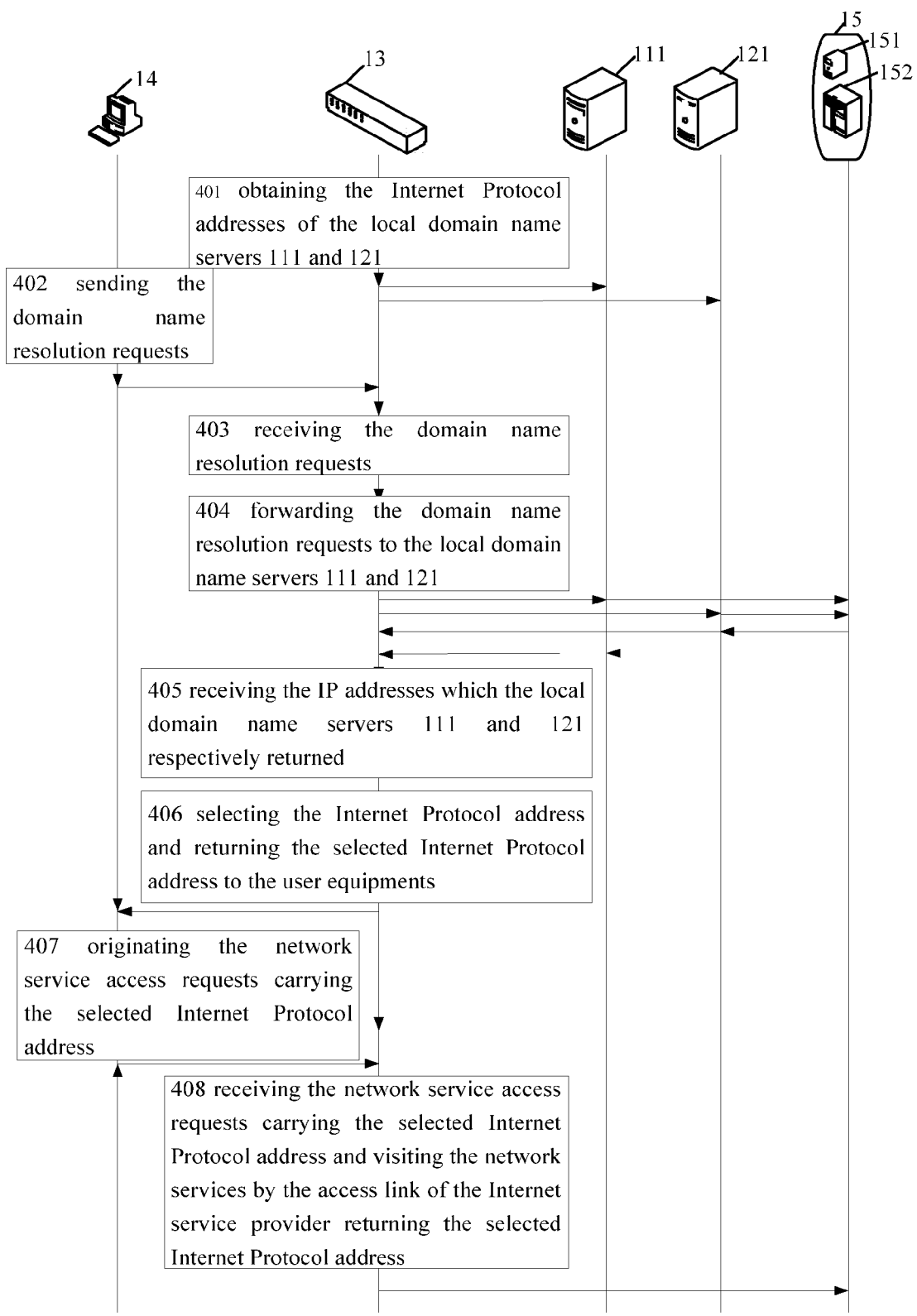
FIG. 4 is a schematic diagram of the interactive process between the access gateway equipments and the user equipments and the local domain name server of Internet service provider in the embodiment of the invention.

FIG. 4 is a schematic diagram of the interactive process between the access gateway equipments and the user equipments and the local domain name server of the Internet service provider in one embodiment of the invention. In the embodiment, taking the network structure shown in FIG. 1 for example, the interactive process includes the following steps:

Step 401: the access gateway equipments 13 obtain the Internet Protocol address of the local domain name server of each Internet service provider providing services;

Step 402: the user equipments 14 send the domain name resolution requests to the access gateway equipments 13;

Step 403: the access gateway equipments 13 receive the domain name resolution requests sent by the user equipments 14;

Step 404: the access gateway equipments 13 forward the domain name resolution requests to the local domain name server 111 of ISP1 through the access link 113 of ISP1 and to the local domain name server 121 of ISP2 through the access link 123 of ISP2;

Here, after the local domain name server of each ISP proving services has received the domain name resolution requests sent by the access gateway equipments, it will forward those requests to the intelligent DNS server of the application service providers and receive the IP address of the network services on the ISP network according to the foregoing domain name resolution rules of the intelligent DNS server and then return the IP address to the access gateway equipments through the corresponding access link. At this time, the access gateway equipments can obtain the Internet Protocol addresses of the network services on different service provider networks.

Step 405: the access gateway equipments 13 receive the IP addresses which the local domain name server 111 of ISP1 and the local domain name server 121 of ISP2 respectively returned from the access link 113 of ISP1 and the access link 123 of ISP2;

Step 406: the Internet Protocol address is selected according to the line state of the access link 113 of ISP1 and the access link 123 of ISP2 and the selected Internet Protocol address is returned to the user equipments 14;

Step 407: the user equipments 14 originate the network service access requests carrying the selected Internet Protocol address to the access gateway equipments 13;

Step 408: the access gateway equipments 13 receive the network service access requests carrying the selected Internet Protocol address sent by the user equipments 14 and visit the network services of the application service provider 15 by the access link of the Internet service provider returning the selected Internet Protocol address.

To sum up, the domain name resolution requests are forwarded to the local domain name server of each service provider through the access link corresponding with the service provider and the Internet Protocol address corresponding to the network services returned by the local domain name server of each service provider is received so as to obtain the Internet Protocol address of the network services on different service provider networks; the Internet Protocol address is selected according to the line state of the access link of each service provider and the selected Internet Protocol address is returned to the user equipments. The network service access requests carrying the selected Internet Protocol address sent by the user equipments are received and the network services are visited through the access link of the service provider corresponding with the Internet Protocol address in the network service access requests, thereby balancing the loads on the access links of different service providers so as to improve the access speed of network services.

What is disclosed above is only a preferred embodiment of the invention and certainly can not be used to limit the scope of the invention, so the same changes made in accordance with the claims of the invention are still covered by the scope of the invention.

What is claimed is:

1. A network service access method, comprising:
   receiving domain name resolution requests sent by user equipments;
   forwarding the domain name resolution requests to a local domain name server of each of multiple Internet service providers providing services through an access link corresponding with each of the Internet service providers;
   receiving an Internet Protocol address on the domain name resolution requests which the local domain name server of each of the Internet service providers returned from the corresponding access link;
   selecting the Internet Protocol address according to a line state of the access link of each of the Internet service providers providing services and returning the selected Internet Protocol address to the user equipments; and
   receiving network service access requests carrying the selected Internet Protocol address sent by the user equipments and visiting network services by the access link of the Internet service provider returning the selected Internet Protocol address.

2. The network service access method according to claim 1, further comprising, before the step of receiving the domain name resolution requests sent by the user equipments:
   obtaining the Internet Protocol address of the local domain name server of each Internet service provider providing services.

3. The network service access method according to claim 2, wherein the step of forwarding the domain name resolution requests to the local domain name server of each Internet service provider providing services further comprises:
   forwarding the domain name resolution requests to the local domain name server of the Internet service provider according to the Internet Protocol address of the local domain name server of the Internet service provider.

4. The network service access method according to claim 3, wherein the step of receiving the Internet Protocol address on the domain name resolution requests which the local domain name server of each Internet service provider returned from the corresponding access link further comprises:
   establishing the association relationship between the Internet Protocol address and the access link of the Internet service provider returning the Internet Protocol address.

5. The network service access method according to claim 4, wherein the step of selecting the Internet Protocol address according to the line state of the access link of each Internet service provider providing services further comprises:
   detecting the line state of the access link of each Internet service provider providing services;
   determining the access link used for visiting the network services according to the line state; and
   obtaining the corresponding Internet Protocol address according to the determined access link used for visiting the network services and the association relationship.

6. An access gateway equipment, comprising:
   a domain name resolution requests receiving module receiving the domain name resolution requests sent by user equipments;
   a forward module forwarding the domain name resolution requests received by the domain name resolution requests receiving module to a local domain name server of each of multiple Internet service providers providing services through an access link corresponding with each of the Internet service providers;
   a network address receiving module receiving an Internet Protocol address on the domain name resolution requests which the local domain name server of each of the Internet service providers returned from the corresponding access link after the forward module had forwarded the domain name resolution requests;
   a select module selecting the Internet Protocol address according to a line state of the access link of each of the Internet service providers providing services after the network address receiving module has received the Internet Protocol address and returning the selected Internet Protocol address to the user equipments; and
   a network service access module receiving the network service access requests carrying the selected Internet Protocol address sent by the user equipments after the select module has returned the selected Internet Protocol address to the user equipments and visiting the network services by the access link of the Internet service provider returning the selected Internet Protocol address.

7. The access gateway equipment according to claim 6, further comprising:
   an obtaining module obtaining the Internet Protocol address of the local domain name server of each Internet service provider providing services.

8. The access gateway equipment according to claim 7, wherein
   the forward module forwards the domain name resolution requests to the local domain name server of the Internet service provider according to the Internet Protocol address of the local domain name server of the Internet service provider.

9. The access gateway equipment according to claim 8, wherein the network address receiving module comprises:
   an association relationship establishing unit establishing the association relationship between the Internet Protocol address and the access link of the Internet service provider returning the Internet Protocol address.

10. The access gateway equipment according to claim 9, wherein the select module further comprises:
   a detection unit detecting the line state of the access link of each Internet service provider providing services;
   a determining unit determining the access link used for visiting the network services according to the line state detected by the detection unit; and
   an address acquisition unit obtaining the corresponding Internet Protocol address in the association relationship establishing unit according to the access link used for visiting the network services determined by the determining unit.

* * * * *